United States Patent [19]

Lange et al.

[11] Patent Number: 5,151,474

[45] Date of Patent: Sep. 29, 1992

[54] PROCESS CONTROL METHOD FOR MANUFACTURING POLYOLEFIN

[75] Inventors: Sandra V. Lange, Lake Jackson; David P. Denton, Richwood; Joseph P. Weller; Jean P. Chauvel, Jr., both of Lake Jackson; Stuart Farquharson, Freeport, all of Tex.; Harry D. Ruhl, Jr., Midland, Mich.; Gregory A. Winter, Lake Jackson, Tex.

[73] Assignee: The Dow Chemical Company, Midland, Mich.

[21] Appl. No.: 481,020

[22] Filed: Feb. 16, 1990

[51] Int. Cl.⁵ .............................................. C08F 2/06
[52] U.S. Cl. ....................................... 526/60; 526/59; 526/70
[58] Field of Search ....................... 526/59, 60; 520/70

[56] References Cited

U.S. PATENT DOCUMENTS

| | | | |
|---|---|---|---|
| 4,370,201 | 1/1983 | Lowenhaupt | 201/1 |
| 4,469,853 | 9/1984 | Mori | 526/59 |
| 4,743,339 | 5/1988 | Faix et al. | 162/49 |
| 4,999,403 | 3/1991 | Datta et al. | 525/289 |

OTHER PUBLICATIONS

Kenneth J. Clevett, Spectrometric Measurements, *Process Analyzer Technology*, 333-336 and 388-392, John Wiley & Sons (1986).
Kirk-Othmer, Olefin Polymers, *Encyclopedia of Chemical Technology*, 3rd Ed., 385-401 (1981).

*Primary Examiner*—Joseph L. Schofer
*Assistant Examiner*—David Wu
*Attorney, Agent, or Firm*—Timothy S. Stevens

[57] ABSTRACT

A process control method for controlling a polyolefin polymerization process, such as a solution polyethylene process, which includes five steps. The first step is to flow a stream of a solvent into a polyolefin reactor, such as flowing a stream of heptane solvent into the reactor at essentially a constant rate. The second step is to add a principal monomer to the stream of solvent, such as by adding ethylene at a controllable rate to the stream of solvent. The third step is to add a co-monomer to the stream of solvent, such as by adding 1-octene at a controllable rate to the stream of solvent. The fourth step is to determine the concentration of the principal monomer and the concentration of the co-monomer in the stream of solvent by high resolution multi-wavelength vibrational spectroscopy analysis, such as by Fourier transform infrared spectroscopy system having a spectral resolution of 4 wavenumbers which analyzes at 1909 wavenumbers for ethylene, at 1829 wavenumbers for 1-octene and at 2120 wavenumbers for a reference signal. The fifth step is to control the rate of addition of the principal monomer, the rate of addition of the co-monomer or preferably the rate of addition of both the principal monomer and the co-monomer according to the determination of the fourth step to obtain the desired concentration of ethylene and 1-octene in the solvent so that, for example, the density of the polyolefin product can be controlled.

18 Claims, 2 Drawing Sheets

PROCESS CONTROL METHOD FOR MANUFACTURING POLYOLEFIN

FIELD OF THE INVENTION

The invention is in the field of chemical process control and more specifically in the field of polyolefin polymerization process control.

BACKGROUND OF THE INVENTION

The commercial production of chemical products almost always requires chemical analysis of various process streams to control the process and to ensure product quality. The chemical analysis can be off-line or on-line. An off-line analysis is accomplished by taking a sample of the process stream and then subjecting it to a laboratory analysis such as a titration. An on-line analysis is usually accomplished by conducting a portion of the process stream directly to a chemical process analyzer such as an on-line gas chromatograph. Some on-line chemical analyzers do not even require sampling the process stream such as by placing a pH electrode directly in a process stream. On-line chemical process analyzers play an important role in modern chemical production because they can reduce processing time, can increase product quality and can reduce costs.

On-line infrared analyzers are known and include analyzers based on Fourier Transform Infrared Spectroscopy (FTIR), see, for example, Chapter 10 of K. Clevett, *Process Analyzer Technology* (1986). U.S. Pat. No. 4,370,201 to Lowenhaupt discloses an on-line FTIR process for maintaining coal proportions in a coal blend. U.S. Pat. No. 4,743,339 to Faix et al. discloses an off-line FTIR process for controlling the digestion of wood pulp.

Polyolefins are often manufactured using a Ziegler type catalyst. An olefin, such as ethylene, is dissolved in a solvent and heated in a reactor under pressure in the presence of the catalyst to form the polyolefin. The polyolefin is then recovered and any unreacted olefin is recycled along with the solvent. Polyolefins have a large number of end uses such as in plastic bags and electrical cable insulation. Polyolefin manufacturers offer hundreds of different grades or types of their product to better meet the needs of these different uses. Often the difference between grades or types of a polyolefin product is a difference in the density of the product.

The density of a polyolefin manufactured using a Ziegler type catalyst can be controlled by dissolving a co-monomer, such as 1-butene, 4-methyl-1-pentene 1-hexene or 1-octene, in the solvent along with the principal monomer, such as ethylene. 16 *Kirk-Othmer Encyclopedia of Chemical Technology*, 385, at 388, also see 402, 421, 433, 453 and 470 (1981).

One means of controlling the process is to install flow meters/flow controllers on the various feed streams to the reactor. Product samples are taken and analyzed. When the desired product density is achieved, the flow meter outputs are noted and then used to automatically control the flow controllers. If the amount and composition of monomers being recycled is constant, then this type of process control can work well. However, the amount and composition of monomers being recycled is not constant because, for example, the activity of the catalyst changes. The output from the flow meters can also drift. The result of these situations can be a change in product density. When such a change is noted, then the flow controllers are adjusted to compensate so that the product density is brought back to the desired value. Polyolefin users have come to expect consistent product quality. If the density of the product changes enough before it is corrected, then the product may not meet specifications and may have to be sold as a lower grade for a lower price. Therefore, it would be an advance in this art if a process control method could be developed that resulted in less variation of product density during the production of a given type of product.

When it is desired to change the density of the product, the flow controllers are set to new values according to previous experience and samples of the product are taken and analyzed. The flow controllers are then fine tuned and when the desired new density is achieved, the flow meter outputs are noted and then used to automatically control the flow controllers. During the time that this change to the new density is being made, the product is likely to be of a lower grade which sells for a lower price. It would be an advance in this art if a process control method could be developed that resulted in a minimum of delay in achieving the new product density.

SUMMARY OF THE INVENTION

The present invention is a process control method for controlling a polyolefin process that results in less variation of product density during the production of a given type of product and results in a more rapid production change to a new density type of product. The present invention comprises five steps. The first step is to flow a stream of solvent into a polyolefin reactor. Preferably, the flow rate of the solvent is controllable. The second step is to add a principal monomer to the stream of solvent. Preferably, the addition of the principal monomer to the stream of solvent is at a controllable rate. The third step is to add a co-monomer to the stream of solvent. Preferably, the addition of the co-monomer to the stream of solvent is at a controllable rate. The fourth step is to determine the concentration of the principal monomer and the concentration of the co-monomer in the stream of solvent by high resolution multi-wavelength vibrational spectroscopy analysis such as by a Fourier transform infrared spectroscopy system having a spectral resolution of 4 wavenumbers. The fifth step is to control the rate of addition of the principal monomer, the rate of addition of the co-monomer or both according to the determination of the fourth step.

DETAILED DESCRIPTION OF THE INVENTION

Figure 1:
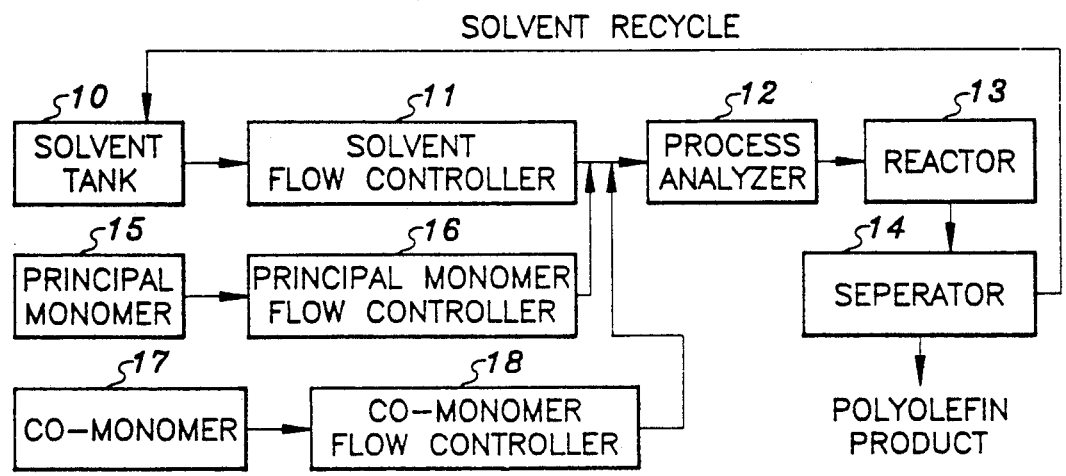
FIG. 1 is a simplified block diagram of a solution polyethylene process which includes a process analyzer used according to the present invention.

Referring now to FIG. 1, therein is shown a block diagram of a Ziegler catalyst solution process for manufacturing polyethylene which includes a solvent tank 10 which holds heptane solvent. The solvent is flowed to a separator 14 through a solvent flow controller 11, a process analyzer 12 and a reactor 13. A supply of principal monomer 15 is flowed through a principal monomer flow controller 16 and added to the solvent stream between the controller 11 and the analyzer 12. The principal monomer is ethylene. A supply of co-monomer 17 is flowed through a co-monomer flow controller 18 and added to the solvent stream between the controller 11 and the analyzer 12. The co-monomer is 1-octene. The ethylene and 1-octene polymerize in the reactor 13 in the presence of a Ziegler catalyst to form a polyolefin product as is well known in the art, i.e., "polyethylene". The separator 14 separates the polyethylene from the solvent and this solvent is recycled back to the solvent tank 10. The process analyzer 12 is connected to the controller 11, the controller 16 and the controller 18 by wires or other suitable means such as optical fibers.

Figure 2:
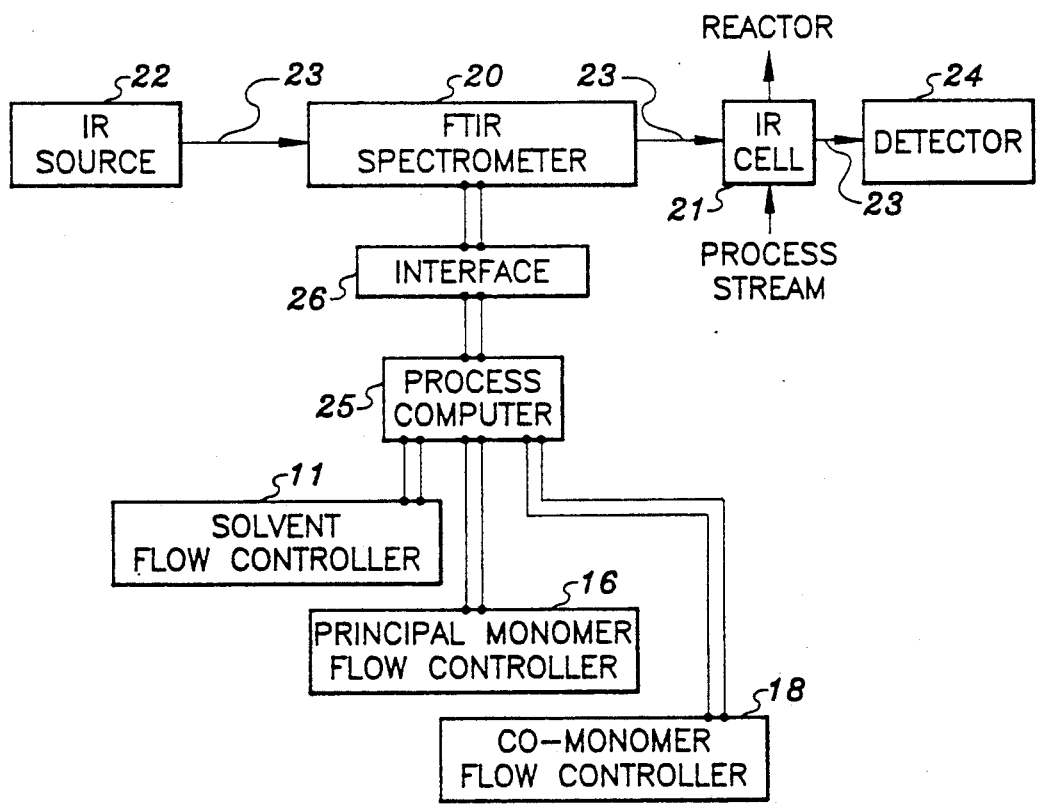
FIG. 2 is a block diagram showing the process analyzer in greater detail.

Referring now to FIG. 2, therein is shown a more detailed block diagram of the process analyzer including a Fourier transform infrared (FTIR) spectrometer 20. The process stream on its way to the reactor is passed through an infrared (IR) cell 21. It is important in the best mode of the present invention, of course, that the solvent, co-monomer and principal monomer be well mixed before being passed through the cell 21. A source of IR light 22 is used to shine a beam of IR light 23 through the spectrometer 20, the IR cell 21 to a detector 24. The spectrometer 20 is connected to a process computer 25 via an interface 26. The process computer is connected to the controllers 11, 16 and 18. The spectrometer 20 is set to determine a background signal at 2120 wavenumbers, the concentration of ethylene in the cell 21 at 1909 wavenumbers and the concentration of octene in the cell 21 at 1829 wavenumbers.

Figure 3:
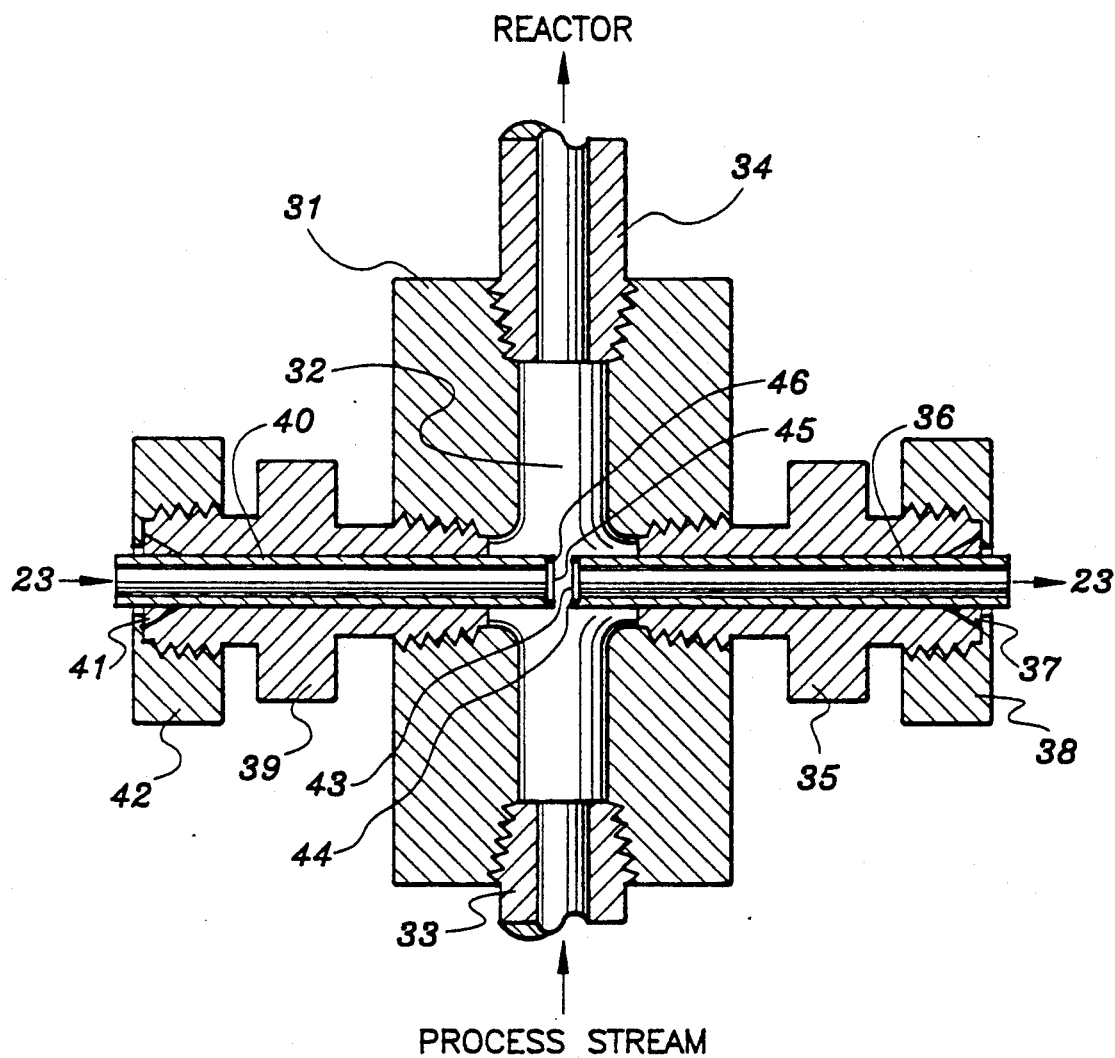
FIG. 3 is a cross-sectional drawing of a preferred infrared cell for use in the present invention.

Referring now to FIG. 3, therein is shown a cross sectional view of a preferred IR cell including a high pressure stainless steel tubing cross 31. A pipe 33 is threadably connected to the cross 31 so that the process stream can be flowed through the pipe 33 and into a chamber 32. A pipe 34 is shown threadably connected to the cross 31 so that the process stream can flow to the reactor. Alternatively, a side stream of the process stream can be passed through the cell 21 when, for example, passing the entire stream through the cell 21 would cause an excessive pressure drop. A stainless steel tubing connector 35 is threadably connected to the cross 31. A stainless steel tube 36 is mounted in the tubing connector 35 by the use of a ferrule 37 and a nut 38. Similarly, a stainless steel connector 39 is attached to the cross 31. A stainless steel tube 40 is mounted in the connector 39 by means of a ferrule 41 and a nut 42. A sapphire window 43 is brazed to the tube 36 by brazing compound 44. Similarly, a sapphire window 45 is brazed to the tube 40 by brazing compound 46. The assemblies 36/43/44 and 40/45/46 (obtained by special order from the Eimac Division of Varian Associates) can be adjusted as to the gap between the window 45 and the window 43 by rotating the connectors 35 and 39. A better material of construction for the tubes 36 and 40 is Kovar Alloy because this alloy has about the same thermal expansion characteristics as sapphire. The tubes 36 and 40 are also better when they taper inward from a diameter of about one inch to a diameter of about one half inch over a distance of about one and one half inches towards the windows 43 and 45 so that a greater amount of infrared light can be focused in the cell. The cell windows are preferably about one half inch in diameter. The cell shown in FIG. 3 (and as improved as discussed above) is preferred because it is leak free (because of the brazed windows) despite the high pressure to which the cell is subjected.

The use of an FTIR system is not critical in the present invention. Any high resolution multi-wavelength vibrational spectroscopy analysis system can be used. Vibrational spectroscopy is defined herein as infrared and Raman spectroscopy, including all methods used to generate wavelengths or frequency dispersion such as Fourier transform and other such techniques, e.g., a Hadamard transform or Fabry-Perot interferometry. The wavelength region of interest is defined to be between 400 and 15,000 wavenumbers, the infrared region being from 400 to 4,000 wavenumbers, the near infrared region being from 4,000 to 15,000 wavenumbers, and the Raman region equivalent to either of these regions using an excitation source anywhere between a wavelength of 150 nanometers and 20 micrometers. A cell through which the process stream is passed is not critical in the present invention and a probe can be used instead of a cell, e.g., a near infrared probe or even a photoacoustic infrared probe. A multi-wavelength analysis according to the present invention means an analysis at least two wavenumbers, one associated with the concentration of the principal monomer and the other associated with the concentration of the co-monomer. In addition, it is preferable to make an analysis at a third reference wavenumber usually selected to be a wavenumber where the principal monomer, the co-monomer and the solvent all have little response. In the polyethylene process outlined above, the 1-octene gave a maximum response at about 1823 wavenumbers while the ethylene gave a maximum response at about 1885 wavenumbers. The actual wavenumbers selected for analysis were 1829 and 1909 for the 1-octene and the ethylene, respectively, with a reference reading at 2120 wavenumbers. High resolution is defined in the present invention as being less than about 25 wavenumbers. Preferably, the spectral resolution is better than about 15 wavenumbers. More preferably, the spectral resolution is better than about 8 wavenumbers. Most preferably, the spectral resolution is about 4 wavenumbers. High resolution is needed because the vibrational spectroscopy response of the principal and co-monomers can be near each other and thus may interfere with each other if the resolution is insufficient. In addition, impurities can build up in the recycled solvent stream that can respond near the principal monomer and the co-monomer. Thus, present filter based infrared spectroscopy units are not suitable in the present invention because sufficiently narrow bandpass infrared filters are not yet available having sufficient transmittance. Chemometrics based on a statistical evaluation of multiple spectral wavenumbers, e.g., 200 different wavelengths, is preferably used in the present invention and is especially suitable when even high resolution does not sufficiently separate bands that are close to each other.

When the principal monomer is ethylene and the co-monomer is 1-octene, a statistical evaluation shows that the calibration function for the ethylene and 1-octene is not exactly linear with a zero intercept when the described FTIR system is used. Instead, the calibration functions show a polynomial fit and are so treated by the system software.

When the principal monomer is ethylene and the co-monomers are 1-octene and 1-propylene, the maximum response for 1-propylene is about 1819 wavenumbers and the maximum response for 1-octene is only about 4 wavenumbers higher or about 1823 wavenumbers. The Center for Process Analytical Chemistry (CPAC, University of Washington, Seattle WA) Partial Least Squares (PLS) 2-Block Version 3.1 chemometric software inputted with the response wavenumbers between 1750 and 2000 wavenumbers is able to provide for calibration and analysis. However, surprisingly better accuracy of results is obtained if a more limited range of wavenumbers is inputted, e.g., 1812-1830 wavenumbers and 1864-1930 wavenumbers.

The term principal monomer is intended herein to mean the olefin that predominates in the polyolefin product on a mole ratio basis. The specific principal monomer is not critical in the present invention but usually it is ethylene, propylene, 4-methyl-1-pentene or other alpha olefin. In addition, the principal monomer of the present invention can include dienes such as are used to manufacture diene rubbers. The specific co-monomer is not critical in the present invention and can include almost any alpha olefin such as 1-butene, 1-pentene, 4-methyl-1-pentene, 1-hexene, 1-heptene, 1-octene, 2-ethyl-1-hexene, 1-nonene, and 1-decene. A smaller portion of the co-monomer is polymerized in the reactor than the principal monomer. The unpolymerized co-monomer and a portion of the unpolymerized principal monomer coming from the reactor is generally recycled with the solvent. It should be understood that the present invention can include analyzing a plurality of co-monomers when a plurality of co-monomers are used in a polyolefin process. It should be understood that the present invention can include determining the concentration of a plurality of principal monomers when a plurality of principal monomers are used in a polyolefin process. The specific solvent is also not generally critical in the present invention and can include an aliphatic solvent such as hexane, heptane, octane, nonane and cyclohexane. A number of solvents are commercially available for such polyolefin processes. The present invention is applicable to any catalysis polyolefin process that uses a solvent stream flowing to a polymerization reactor such as the well known slurry and solution processes. The specific solvent flow controller, principal monomer flow controller and co-monomer flow controller, when used, are not critical in the present invention and are well known in the chemical processing art. In its broadest scope, the present invention only requires control of the rate of addition of either the co-monomer or the principal monomer. However, it is often most preferable to control the addition of both the principal monomer and the co-monomer to the solvent so that the ratio of the concentration of the co-monomer to the combined concentrations of the co-monomer and the principal monomer is essentially constant. This ratio can be computed on a weight percent concentration basis but it is believed to be more preferable that the ratio be computed on a mole percent concentration basis. Although density control of the product is the primary benefit of the present invention, other product characteristics are effected by control of the rate of addition of one or both of the principal monomer and the co-monomer, such as molecular weight distribution and melt index. Thus, the present invention can be used to control these and other characteristics as well.

EXAMPLE

A Laser Precision Analytical PCM-4000 process FTIR having a 25 MHz 386/387 Compaq computer programed with Laser Precision Analytical FTIR data acquisition and control software as well as with Laser Precision Process Control software, available from Laser Precision Analytical, Irvine California, is installed on a vibration isolation table in an air conditioned instrument shack near the reactor feed line of a solution polyethylene polymerization process. The FTIR is equipped with the improved cell discussed above. The cell gap is adjusted to be about 0.025 inches. A side stream of the reactor feed is flowed through the cell. The FTIR computer communicates with the polyethylene process computer via an Opto-22 interface available from Laser Precision. The process computer is connected to a myriad of sensors, valves, flow meters, pumps, thermocouples etc. necessary to monitor, control and document the process, including flow control valves for controlling the rate of addition of ethylene and 1-octene to the solvent stream of heptane solvent flowing into the polymerization reactor.

The analyzer is calibrated to obtain a polynomial calibration function by passing known concentrations of ethylene and 1-octene in heptane through the cell using the absorbance at 1829, 1909 and 2120 wavenumbers as discussed above. The process is set to manufacture polyethylene having a density of 0.940 grams per cubic centimeter. The process flow meters/flow controllers are set so that the ratio of the addition of co-monomer to the addition of co-monomer and principal monomer is a constant. The analyzer is used to monitor the solvent process stream flowing into the reactor but not yet to control the process. The actual density of the product over a given period of time is determined by periodic off-line laboratory analysis which shows a variation of about plus or minus 0.002 grams per cubic centimeter. The analyzer determines the concentration of ethylene and 1-octene in the solvent over this period of time and variations in the ratio of 1-octene to 1-octene and ethylene are noted despite the desire that there be none.

Now the analyzer is used to control the process. The rate of addition of the ethylene and especially the 1-octene is controlled according to the analyzer's determination of the concentration of ethylene and 1-octene in the solvent so that the ratio of the concentration of the co-monomer to the combined concentrations of the co-monomer and the principal monomer is essentially a constant value. The actual density of the product over this additional period of time is determined by periodic off-line laboratory analysis which shows a variation of about plus or minus 0.001 grams per cubic centimeter.

The process is then changed to make polyethylene having a density of 0.950 grams per cubic centimeter. This is done by controlling the ratio of the concentration of the co-monomer to the combined concentrations of the co-monomer and the principal monomer at a different essentially a constant value determined according to previous experience. The time needed to make this change using the present invention is about half the time needed when the present invention is not used.

What is claimed is:

1. A process control method for controlling a polyolefin polymerization process, comprising the steps of:
    (a) flowing a stream of recycled solvent into a polyolefin polymerization reactor;
    (b) adding a principal olefin monomer to the stream of recycled solvent;
    (c) adding a co-monomer to the stream of recycled solvent at a controllable rate;

(d) determining the concentration of the principal monomer and the concentration of the co-monomer in the stream of recycled solvent by high resolution multi-wavelength vibrational spectroscopic analysis; and (e) controlling the rate of addition of the co-monomer according to the determination of step (d).

2. The method of claim 1, wherein in step (b) the principal olefin monomer is added to the stream of recycled solvent at a controllable rate, and in step (e) both the rate of addition of the co-monomer and the rate of addition of the principal monomer are controlled according to the determination of step (d).

3. The method of claim 2, wherein the principal monomer is ethylene.

4. The method of claim 3, wherein the co-monomer is 1-octene.

5. The method of claim 4, wherein the high resolution multi-wavelength vibrational spectroscopic analysis is a Fourier transform infrared spectroscopy analysis.

6. The method of claim 5, wherein the analysis is at about 1829 wavenumbers for 1-octene and at about 1909 wavenumbers for ethylene with a reference at about 2120 wavenumbers.

7. The method of claim 1, wherein the high resolution multi-wavelength vibrational spectroscopic analysis is an infrared analysis.

8. The method of claim 1, wherein the high resolution multi-wavelength vibrational spectroscopic analysis is a near infrared analysis.

9. The method of claim 1, wherein the high resolution multi-wavelength vibrational spectroscopic analysis is a Raman analysis.

10. The method of claim 2, wherein the principal monomer is 1-propylene.

11. The method of claim 2, wherein the principal monomer is 1-butene.

12. The method of claim 2, wherein the principal monomer is 4-methyl-1-pentene.

13. A process control method for controlling a polyolefin polymerization process, comprising the steps of:
(a) flowing a stream of recycled solvent into a polyolefin reactor;
(b) adding a principal olefin monomer to the stream of recycled solvent at a controllable rate;
(c) adding a co-monomer to the stream of recycled solvent;
(d) determining the concentration of the principal monomer and the concentration of the co-monomer in the stream of recycled solvent by high resolution multi-wavelength vibrational spectroscopic analysis; and
(e) controlling the rate of addition of the principal monomer according to the determination of step (d).

14. A process control method for controlling a polyolefin polymerization process, comprising the steps of:
(a) flowing a stream of recycled solvent into a polyolefin reactor;
(b) adding a principal olefin monomer to the stream of recycled solvent at a controllable rate;
(c) adding a co-monomer to the stream of recycled solvent at a controllable rate;
(d) determining the concentration of the principal monomer and the concentration of the co-monomer in the stream of recycled solvent by high resolution multi-wavelength vibrational spectroscopic analysis; and
(e) controlling the rate of addition of the principal monomer and the rate of addition of the co-monomer according to the determination of step (d) so that the ratio of the concentration of the co-monomer to the combined concentrations of the co-monomer and the principal monomer is essentially constant.

15. The method of claim 14, wherein the principal monomer is ethylene.

16. The method of claim 15, wherein the co-monomer is 1-octene.

17. The method of claim 16, wherein the high resolution multi-wavelength vibrational spectroscopic analysis is a Fourier transform infrared spectroscopy analysis.

18. The method of claim 17, wherein the analysis is at 1829 wavenumbers for 1-octene and at 1909 wavenumbers for ethylene with a reference at 2120 wavenumbers.

* * * * *